[19] United States Patent
Strauss et al.

[11] 4,096,102
[45] Jun. 20, 1978

[54] MOLDABLE COMPOSITIONS COMPRISING THERMOSETTING POLYESTER RESIN AND THERMOPLASTIC RESIN

[75] Inventors: Carl R. Strauss, Newark; Michael G. Roberts, Heath; Charles E. Bolen, Newark, all of Ohio

[73] Assignee: Owens-Corning Fiberglas Corporation, Toledo, Ohio

[21] Appl. No.: 735,485

[22] Filed: Oct. 26, 1976

Related U.S. Application Data

[63] Continuation of Ser. No. 544,454, Jan. 27, 1975, abandoned.

[51] Int. Cl.$^2$ ............................................. C08G 63/02
[52] U.S. Cl. ........................... 260/22 D; 260/18 TN
[58] Field of Search ............ 260/18 TN, 22 D, 485 P, 260/485 G

[56] References Cited

U.S. PATENT DOCUMENTS

| | | | |
|---|---|---|---|
| 3,257,335 | 6/1966 | Whitfield et al. | 260/2.3 |
| 3,344,091 | 9/1967 | Russin et al. | 260/2.3 |
| 3,406,134 | 10/1968 | Seiwert et al. | 260/22 D |
| 3,427,267 | 2/1969 | Stieger et al. | 260/22 CB |
| 3,496,220 | 2/1970 | McCarty et al. | 260/475 P |
| 3,506,622 | 4/1970 | Higgins | 260/75 R |
| 3,673,132 | 6/1972 | Parker et al. | 260/22 D |
| 3,689,461 | 9/1972 | Balint et al. | 260/75 M |
| 3,701,748 | 10/1972 | Kroekel | 264/331 |
| 3,801,532 | 4/1974 | Olstowski | 260/18 TN |
| 3,823,219 | 7/1974 | Ward et al. | 264/331 |
| 3,824,201 | 7/1974 | McGranaghan et al. | 260/18 TN |
| 3,867,349 | 2/1975 | Heeg et al. | 260/75 M |
| 3,882,189 | 5/1975 | Hudak | 260/18 TN |
| 3,884,850 | 5/1975 | Ostrowksi | 260/2.3 |

*Primary Examiner*—Ronald W. Griffin
*Attorney, Agent, or Firm*—Ronald C. Hudgens; Philip R. Cloutier; John W. Overman

[57] ABSTRACT

Thermoplastic additives comprising the esterification product of a polyol with dimer and trimer acids are blended with thermosetting resins to reduce the shrinkage of the latter on molding.

14 Claims, No Drawings

MOLDABLE COMPOSITIONS COMPRISING THERMOSETTING POLYESTER RESIN AND THERMOPLASTIC RESIN

This is a continuation of application Ser. No. 544,454, filed Jan. 27, 1975, now abandoned.

This invention relates to thermoplastic additives for molding compounds.

In one of its more specific aspects, this invention relates to thermoplastic additives which, when incorporated into sheet and bulk molding compounds, improve the molding characteristics of the molding compounds.

Thermosetting resin prepolymers, which are frequently unsaturated polyesters which crosslink during curing to a thermoset condition, are well known. When thermosetting polyesters are employed in sheet and bulk molding compounds which are molded, the molded product usually evidences shrink and sink and possesses a dull surface.

In order to eliminate at least a portion of these difficulties, it is customary to incorporate into the thermosetting polyester resin at least one thermoplastic resin. The thermosetting resin and thermoplastic resin are mixed in the form of syrups and the combination of resin syrups is blended with fillers, crosslinking agents and gelling agents to form a moldable composition. These compositions upon molding form molded products containing the thermosetting polyester resin as the continuous phase with the thermoplastic resin dispersed therein.

The present invention provides a novel thermoplastic resin additive which is incorporated in a thermosetting polyester resin to reduce shrinkage and to improve the surface characteristics of the molded product.

According to this invention, there is provided a moldable composition comprising a thermoplastic additive produced by esterification of a polyol with a dimer acid or with a trimer acid. In one embodiment of the invention, a mixture of dimer and trimer acids is employed to produce the additive.

Also according to this invention, there is provided a moldable composition comprising a thermoplastic additive produced by esterification of a mixture comprising (1) a polyol and (2) a mixture of glycols and oligomers, with (3) dimer or trimer acids. In one embodiment of this invention, a mixture of dimer and trimer acids is employed to produce the additive.

Also, according to this invention, there is provided a method of producing a moldable compound which comprises incorporating into a thermosetting polyester resin matrix a thermoplastic additive comprising at least one of the aforesaid thermoplastic additives.

The unsaturated thermosetting polyester resins, in themselves, are well known in the art as are the methods of preparing them. Such polyesters can be prepared by condensing an a,a,-ethylenically unsaturated dicarboxylic acid or anhydride, or mixtures thereof, with a dihydric alcohol or mixtures of dihydric alcohols. In this respect, the term "dicarboxylic acid" is intended to include anhydrides of the corresponding acids. It is preferred that the carboxylic acid present in the polyester be of the unsaturated variety. Examples of preferred unsaturated dicarboxylic acids are maleic and fumaric acids. Dihydric alcohols which are useful in preparing the polyesters include propylene glycol, dipropylene glycol, diethylene glycol, 1,3-butanediol, and the like, and their mixtures.

The unsaturated, thermosetting polyester resins employable in the invention are produced under prior art conditions including a temperature within the range of from about 90° to about 400° F with the reaction being terminated by the use of materials such as toluhydroquinone, hydroquinone, methyl ether of hydroquinone, m-dinitrobenzene, and the like. The polymerization is terminated preferably at an acid number less than about 100, with an acid number of about 30 being particularly suitable.

The monomer employed in this invention with which the resins are blended is a liquid monomer or mixture of monomers having at least one ethylenically active $-C=C<$ group per molecule. The monomeric liquid substance must be copolymerizable with the unsaturated polyester and develop therewith a crosslinked or thermoset structure. The monomer must act as a solvent for the unsaturated polyester resin and the thermoplastic additive over a wide range of concentrations. Examples of suitable monomers are styrene, vinyl toluene, methyl methacrylate, butylmethacrylate and the like and mixtures thereof.

The thermoplastic additives of this invention are produced using conventional esterification techniques employing reactants such as are described hereinafter. Preferably, the esterification will be conducted at a temperature within the range of from about 180° to about 200° C and at atmospheric pressure, the reaction being initiated by catalysts such as dibutyl tin oxide and the like, the catalyst being employed in an amount of about 0.2 weight percent based upon the total weight of the reactants. Water is distilled from the reaction mixture employing a nitrogen sparge until the reaction is complete as indicated by cessation of the production of water.

The polyol which can be used in this invention will have a functionality of from about 2.4 to about 3 and a number average molecular weight of about 315 to about 400. The hydroxyl groups are principally primary and terminal. The molecular structure of the polyol contains both polyether and polyester groups.

One suitable polyol which can be used in this invention is obtainable as "Urol 11" from U.C.T. Inc., Louisville, Kentucky. This material has a hydroxyl number of from 400-460, an acid number of about 0.2 maximum, an average equivalent weight of about 130, a pH of about 7.1 and a specific gravity of about 1.03.

The mixture of glycols and oligomers which can be used to produce the thermoplastic additive employed in the invention will have the following analyses.

| Composition | Composition, Weight Percent | |
|---|---|---|
|  | Range | Preferred |
| Ethylene glycol | 3-10 | 4-10 |
| Diethylene glycol | 3-7 | 3-7 |
| Triethylene glycol | 0.1-5 | 0.1-3 |
| Ethylene glycol monomer | 12-35 | 14.5-30 |
| Diethylene glycol monomer | 1-13 | 2-12 |
| Mixed monomers | 3-15 | 5-13 |
| Oligomers | 27-67 | 40-65 |

The mixture will have a hydroxyl number within the range of from about 250 to about 650 with a preferred range being from about 300 to about 500.

In the above mixture, the monomers and the oligomers can be considered as having the following formulas:

Ethylene glycol monomer

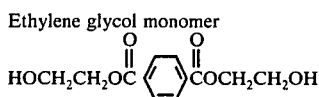

Diethylene glycol monomer

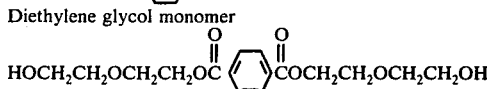

Mixed Monomers

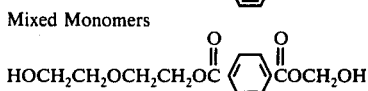

Oligomers

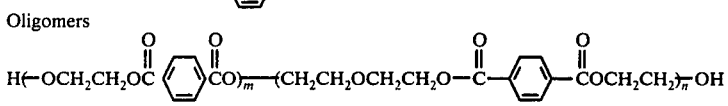

wherein m is, generally, greater than n and wherein the sum of m plus n is within the range of from 2 to 4.

Mixtures of glycols and oligomers such as that described above are commercially available. This material has a number average molecular weight, as measured by gel permeation chromotography, within the range of from about 660 to about 870 and a dispersity within the range of from about 1.3 to about 1.6.

The dimer acids which can be reacted with the mixture of glycols and oligomers to produce the thermoplastic additives are aliphatic, dibasic acids whose structure is essentially that of a long chain dicarboxylic acid containing at least 36 carbon atoms in the chain with at least two alkyl side chains and at least one ethylenic bond. The alkyl groups will be of such structure that the dimer acids will have an approximate molecular weight of about 565 and an approximate equivalent weight of about 283.

The trimer acids which can be reacted with the mixture of glycols and oligomers to produce the thermoplastic additives are long chain tricarboxylic acids containing at least 54 carbon atoms in the chain with three or more appended alkyl side chains and at least one ethylenic bond. The alkyl groups will be such that the trimer acids will have an approximate molecular weight of about 850 and an approximate equivalent weight of about 283.

One suitable dimer acid which is commercially available is "Empol 1016" from Emery Industries, Cincinnati. This material contains about 87% dimer acid having a molecular weight of about 565, about 13% trimer acid having a molecular weight of about 845 and a trace of monobasic acids having a molecular weight of about 282. This mixture has an acid value within the range of from about 190 to about 198, a saponification number of from about 194 to about 200, a neutral equivalent from about 284 to about 295 and a specific gravity of about 0.97.

Another suitable dimer acid commercially available is "Empol 1022" from Emery Industries, Cincinnati. This material contains about 75% dimer acid having a molecular weight of about 565, about 22% trimer acid having a molecular weight of about 845 and about 3% monobasic acids having a molecular weight of about 282. This mixture has an acid value within the range of from about 189 to about 197, a saponification number of from about 191 to about 199, a neutral equivalent from about 284 to about 297 and a specific gravity of about 0.95.

Another suitable dimer acid commerciallt available is "Empol 1024" from Emery Industries, Cincinnati. This material contains about 75% dimer acid having a molecular weight of about 565, about 25% trimer acid having a molecular weight of about 845 and a trace of monobasic acids having a molecular weight of about 282. This mixture has properties comparable to those set out above for Empol 1022.

A suitable trimer acid commercially available is "Empol 1040" from Emery Industries, Cincinnati. This material contains about 20% dimer acid having a molecular weight of about 565, about 80% trimer acid having a molecular weight of about 845 and a trace of monobasic acids having a molecular weight of about 282. This mixture has an acid value within the range of from about 183 to about 191, a saponification number of from about 192 to about 200 and a specific gravity of about 0.97.

As stated, either the dimer acid or the trimer acid, or mixtures of the two acids, can be reacted with the mixture of glycols and oligomers and polyol to produce the thermoplastic additive. If a mixture of the acids is employed, the weight ratio of the dimer acid to the trimer acid can be within the range of from about 0.3 to about 100 parts of the dimer acid to 1 part of the trimer acid. Preferably, this weight ratio will be within the range of from about 0.5 to about 1 part of the dimer acid to 1 part of the trimer acid.

The amount of dimer acid, or trimer acid, or mixtures thereof, which is reacted with the polyol can vary over a wide range. Regardless of which acid or mixture of acids is employed, the weight ratio of acid, or mixture of acids, to the polyol should preferably be within the range of from about 2 to about 5 parts of the acid, or mixtures of acids, to 1 part of the polyol. Relatedly the weight ratio of acid, or mixture of acids, to the total weight of the polyol and glycol-oligomer mixture should be within the range of from about 1.5 to about 5 parts of the acid, or mixture of acids, to 1 part of the total weight of the polyol and glycol-oligomer mixture. Relatedly, the weight ratio of the polyol to the glycol-oligomer mixture should be within the range of from about 0.1 to about 9 parts of the polyol per part of the glycol-oligomer mixture.

The thermoplastic additive resin can be introduced into the polyester resin in any suitable manner. Preferably, both resins will be employed in the form of monomer-containing syrups, the polyester resin being contained in a syrup in an amount of about 67 percent by weight and the thermoplastic additive being contained in a syrup in an amount of about 33 to about 40 percent by weight. On this basis, the thermoplastic additive will be employed in the polyester resin in an amount within the range of from about 30 parts to about 50 parts by weight per 100 parts by weight of the total of the two resins. Preferably, the thermoplastic additive will be employed in an amount of about 35 to about 40 parts by weight per 100 parts by weight of the total of the two resins.

The following examples demonstrate the effectiveness of the thermoplastic additives of this invention in respect to improving the surface characteristics of molded polyester resins.

Example 1 demonstrates the preparation of a typical thermosetting polyester resin syrup. Each of the thermoplastic additives, the production of which is described later, was blended with the polyester resin to demonstrate molding improvements.

EXAMPLE I

A thermosetting polyester resin syrup was prepared from the following materials substantially in the following manner.

| Materials | Parts by Weight |
|---|---|
| Propylene Glycol | 578.2 |
| Maleic Anhydride | 674.4 |
| Toluhydroquinone Solution (25% solution in styrene) | 6.8 |

The polyester resin syrup was prepared by charging all of the propylene glycol and one third of the maleic anhydride into the reactor while using a continuous nitrogen sparge. The temperature of the contents of the reactor was raised to 190° F and about 4 hours after the first distillate, about one-half of the toluhydroquinone solution was added. When the reactor contents reached an acid value of about 35, the remainder of the toluhydroquinone was added. Thereafter, the remainder of the maleic anhydride was added at a rate of 10 to 15 parts per minute while controlling the temperature of the mixture at 300° F. Thereafter, the temperature of the mixture was held at 310° to 320° F for 60 minutes, after which the temperature was increased to 400° F. The material in the reactor at this point had an acid number of 29 to 32 and 2 parts of the reactor contents diluted with one part of styrene has a viscosity of 21 to 25 at 350° F (SSU).

The contents of the reactor were cooled to 340° F and diluted with styrene in an amount of 90 parts of reactor contents to 10 parts of styrene to produce a composition stable for 30 minutes at 120° C before gelling.

In another vessel, 486.4 parts by weight of styrene and 0.125 parts by weight of mono-tertiary butylhydroquinone were mixed and held at a temperature within the range of 130° to 145° F. Thereafter, 1,138 parts of the polyester resin, produced as described above and at a temperature of about 333° F were added to the styrene-hydroquinone mixture to product a thinned polyester syrup which, at a temperature of 180° F, had a viscosity in the range of 1500-2000 cps., a maximum water content of about 0.8 weight percent and a monomer content of about 34 weight percent.

EXAMPLE II

This example demonstrates the preparation of a series of thermoplastic additives. The materials and conditions employed are indicated in Table I.

TABLE I

| Thermoplastic Additive Number | I | II | III | IV | V | VI | VII |
|---|---|---|---|---|---|---|---|
| Polyol, gms. | 100 | 100 | 100 | 0 | 430 | 60 | 125 |
| Acid, total gms. | 150 | 275 | 330 | 342 | 373 | 368 | 375 |
| Dimer Acid, gms. | 112 | 240 | 287 | 297 | 325 | 320 | 326 |
| Trimer Acid, gms. | 38 | 35 | 43 | 45 | 58 | 48 | 49 |
| Monobasic Acid, gms. | Tr | Tr | Tr | Tr | Tr | Tr | Tr |
| Glycol-Oligomer, gms. | 0 | 0 | 0 | 125 | 90 | 60 | 0 |
| Catalyst | | | | | | | |
| Dibutyl Tin Oxide, gms. | 0.5 | 0.75 | 0.8 | 0.9 | 1.0 | 1.0 | 1.0 |
| Reaction Conditions | | | | | | | |
| Temperature, ° C | 195–196 | 195 | 195 | 195–198 | 195–199 | 196–201 | 195–198 |
| Time, Hrs. | 4 | 5.1 | 5.4 | 5.75 | 6 | 5.8 | 5.5 |
| Distillate, ml. | 9 | 10 | — | 18.5 | 17.3 | 16.5 | 14.5 |
| Thermoplastic Additive Acid No. | — | — | — | 18 | 32 | 21 | Insol. |

The above data demonstrate that suitable thermoplastic additives can be produced over a wide range of combinations of the polyol, dimer and trimer acids and the glycol-oligomer mixture.

EXAMPLE III

The thermoplastic additives, designated as III, IV, V, VI and VII in Table I were individually mixed with styrene to produce thermoplastic additive compositions containing about 33 percent solids.

The thermosetting polyester produced in Example I was mixed with styrene to produce a resin-containing composition containing about 67 percent solids.

The thermoplastic additives were then individually incorporated with the thermosetting polyester resin into molding compounds made up of the following materials.

| | Parts by Weight |
|---|---|
| Thermosetting Polyester (67% solids) | 840 |
| Thermoplastic Additive (40% solids) | 560 |
| Zinc Stearate | 52 |
| t-butyl perbenzoate | 14 |
| Calcium Carbonate | 2079 |
| Magnesium hydroxide | 42 |
| Glass | 1548 |

The glass was in the form of chopped fibers approximately ¼ inch in length.

The thermosetting polyester, the thermoplastic additive, the zinc stearate and the calcium carbonate were blended to form a smooth paste. The magnesium hydroxide was added to the paste and mixing was continued for 2 minutes. The chopped glass was then added and mixing was continued for an additional 2.5 minutes.

Five individual molding compounds, each incorporating one of the aforementioned thermoplastic additives, were molded into 12 inch by 12 inch flat panels at a molding temperature within the range of from 290° to 300° F, at a pressure of 1000 psi at a cure time of approximately 3 minutes. Three panels were produced from each batch. The linear expansion of the molded sheets in each direction was determined in three separate readings, eighteen determinations being made relative to each molding compound.

Results were as follows:

| Thermoplastic | Shrinkage, mils | Shrinkage, mils/inch |
|---|---|---|
| III | + 0.78 | 0.07 + |
| IV | + 2.2 | 0.18 + |
| V | + 2.4 | 0.20 + |
| VI | + 2.4 | 0.20 + |
| VII | + 2.2 | 0.18 + |

It will be noted from the above data that all panels underwent expansion rather than shrinkage.

The molding compound employed herein, when comprised of the thermosetting polyester resin, in the absence of the thermoplastic additive, exhibits shrinkages of approximately 3.5 to 4.0 mils per inch. Accordingly, the thermoplastic resins of this invention significantly improve the molding characteristics of thermosetting resins into which the thermoplastic resins are blended.

It is seen from the foregoing that this invention provides thermoplastic additives which, then incorporated in polyester resins, enable the production of molded products having acceptable molding characteristics. As such, this invention relates a significant savings in scarce materials inasmuch as one polyol and one glycol-oligomer mixture which can be satisfactorily employed are by-products from commercial processes and the disposal of these by-products poses problems since heretofore these products have found only little utility.

It will be evident from the foregoing that various modifications can be made to this invention. Such, however are considered to be within the scope of the invention.

What is claimed is:

1. A moldable composition comprising a thermosetting polyester resin and a thermoplastic resin, said thermoplastic resin comprising the reaction product of a polyol and a dimer acid or a trimer acid, said dimer acid being an aliphatic, dibasic, long chain acid having at least 36 carbon atoms in said chain and having two alkyl side chains and having at least one ethylenic bond, said trimer acid being an aliphatic, tribasic, long chain acid having at least 54 carbon atoms in said chain and at least three alkyl side chains and at least one ethylenic bond.

2. The moldable composition of claim 1 in which said polyol has a functionality of from about 2.4 to about 3 and a number average molecular weight within the range of from about 315 to about 400.

3. The moldable composition of claim 1 in which said thermoplastic resin is the reaction product of said polyol and a mixture of dimer acids and trimer acids.

4. The moldable composition of claim 3 in which said mixture of acids is reacted with said polyol in an amount within the range of from about 2 to about 5 parts by weight of said mixture of acids to 1 part by weight of said polyol.

5. The moldable composition of claim 1 in which said thermoplastic resin is the reaction product of said polyol, said dimer acid or said trimer acid and a mixture of glycols and oligomers.

6. The moldable composition of claim 5 in which said reaction product is the reaction product of said polyol, a mixture of said dimer acid and said trimer acid and a mixture of glycols and oligomers.

7. The moldable composition of claim 6 in which said mixture of acids is reacted with said polyol and said mixture of glycols and oligomers in an amount within the range of from about 1.5 to about 5 parts by weight of said mixture of acis to 1 part by weight of the total weight of said polyol and said glycol-oligomer mixture.

8. A method of improving the molding characteristics of a molding compound comprising a thermosetting polyester which comprises incorporating in said molding compound a thermoplastic resin comprising the reaction product of a polyol and a dimer acid or a trimer acid, said dimer acid being an aliphatic, dibasic, long chain acid having at least 36 carbon atoms in said chain and two alkyl side chains and at least one ethylenic bond, said trimer acid being an aliphatic, tribasic, long chain acid having at least 54 carbon atoms in said chain and at least three alkyl side chains and at least one ethylenic bond.

9. The method of claim 8 in which said polyol has a functionality of from about 2.4 to about 3 and a number average molecular weight within the range of from about 315 to about 400.

10. The method of claim 8 in which said thermoplastic resin is the reaction product of said polyol and a mixture of dimer acids and trimer acids.

11. The method of claim 10 in which said mixture of acids is reacted with said polyol in an amount within the range of from about 2 to about 5 parts of said mixture of acids to 1 part of said polyol.

12. The method of claim 8 in which said thermoplastic resin is the reaction product of said polyol, said dimer acid or said trimer acid and a mixture of glycols and oligomers.

13. The method of claim 12 in which said reaction product is the reaction product of said polyol, a mixture of said dimer acid and said trimer acid and a mixture of glycols and oligomers.

14. The method of claim 13 in which said mixture of acids is reacted with said polyol and said mixture of glycols and oligomers in an amount within the range of from about 1.5 to about 5 parts by weight of said mixture of acids to 1 part by weight of the total weight of said polyol and said mixture of glycols and oligomers.

* * * * *